US005328729A

United States Patent [19]

Lamonte, Jr.

[11] Patent Number: 5,328,729

[45] Date of Patent: Jul. 12, 1994

[54] CUT-TO-FIT, PEEL AND STICK POSTER FRAME

[76] Inventor: Edward R. Lamonte, Jr., 1653 Andis Rd., Burlington, Wash. 98233

[21] Appl. No.: 958,177

[22] Filed: Oct. 8, 1992

[51] Int. Cl.[5] ................ B32B 9/00

[52] U.S. Cl. ................ 428/14; 428/13; 428/40; 428/43; 428/192

[58] Field of Search ................ 428/14, 13, 40, 43, 428/192, 178, 343, 41, 189, 190, 191, 187

[56] References Cited

U.S. PATENT DOCUMENTS 4,301,199 11/1981 Pfanstiehl ................ 428/14

*Primary Examiner*—Patrick J. Ryan
*Assistant Examiner*—Abraham Bahta
*Attorney, Agent, or Firm*—Hughes & Multer

[57] ABSTRACT

A strut supported framework for mounting directly to the back side of posters and other works of art which holds the paper skin of the poster taut. The framework is composed of elongated semi-ridged, strut members bonded to adjustable low tack adhesive tape. Strut members can be easily cut to fit the back side perimeter of most any standard sized posters. The strut members are stabilized by plastic like, adhesive bonded corner support braces positioned over the right angles formed by the framework. The framework parts include four frame members and four corner support braces. The frame members are slit from a simi-ridged foamboard like material. The corner support braces are die-cut shaped pieces of plastic like material. Both the frame struts and the corner support braces are bonded to one side of a double sided, pressure sensitive, adhesive tape with a release liner protecting the revere side of the adhesive tape. Each frame strut is measured, marked, cut, and affixed in position so as to be squared off to form a right angle on the outer perimeter of the back side of a poster. The steps to constructing the framework follows an established sequential order.

12 Claims, 3 Drawing Sheets

CUT-TO-FIT, PEEL AND STICK POSTER FRAME

BACKGROUND OF THE INVENTION

The present invention extends the concept of poster frames to include cut to size, adjustable, reposition adhesive lined frame struts which support posters or other art works of any standard size. Previous framing devices have taken numerous forms, each having functioned with measured success. The overriding consideration of existing frames has been to provide a degree of aesthetical and decorative frame support most often requiring ridged materials such as wood or metal, and/or, semi-ridged backing materials such as cardboard or foamboard. Because of framing costs however, most posters are still displayed on walls or doors using adhesive tapes, tacks, or staples as affixing agents. Past Framing devices have not addressed the need for a simple and easy cut to fit, adjustable sized poster frame. Furthermore, past frame devices have been viewed primarily as decorative additions rather than as a non-exposed support frameworks. While both cardboard and foamboard sheets do display posters or other works of art from the back side, both materials present problems of durability, convenience, and, flexibility.

There exists a need for an economical, compact, yet flexible direct mount poster frame which can be easily measured and cut to size; would utilize adhesive tape which would allow for the repositioning of frame members if misaligned; and is light weight, yet, self-supporting and easily hung.

PRIOR ART

U.S. Pat. No. 4,301,199 (Phanstiehl) shows a system with end strips having mitered edges. Each end piece has a decorative front face and an adhesive back face which is covered by a tear-off sheet. These pieces are mounted to a roll. However, each strip may be applied individually with its own protective tear-off sheet. The protective sheets are removed from the strips to expose the adhesive, and then the strip members are attached to the edge portions of the poster to form the frame. There are two methods shown for assembling the frame. In the first method the protective sheet is made in two portions where there is a separate line. First, one sheet portion is peeled off, and the strip is mounted against the wall. The poster is put into place and then bonded to the strip. Then the rest of the strips are applied to make a complete frame. The second method shows how the edge strips are first assembled. The protective sheets are removed to expose adhesive, and the poster is put into place.

U.S. Pat. No. 4,976,055 (Kane) shows a wall mountable frame for posters which uses pre-cut edges, spacers and back panels with adhesive strips.

U.S. Pat. No. 4,330,952 (Swanson) shows a frame constructed of interlocking members to hold a poster. A cord is placed around the perimeter of the frame to hold the components in place.

U.S. Pat. No. 4,231,833 (Lieberman) shows a linear adhesive strip used as a means to frame a sheet.

U.S. Pat. No. 3,289,343 (Jensen et al) shows an assemblage of cardboard edge members arranged in a rectangular frame.

U.S. Pat. No. 3,024,553 (Rowley) shows the use of adhesive strips to hold framed artwork in place.

OBJECT OF THE INVENTION

A object of this invention is to provide a framework of self bonding strut members which could be easily affixed directly on to the back side of any poster and could be reinforced by simple corner support braces, which acting in combination, would hold a poster taut.

Another object of this invention is to provide strut members which, while being affixed to a poster, would avoid damage to the poster by allowing the user to remove and reposition a strut member if it becomes misaligned on the poster's back during the construction of the framework.

Another object is to provide an economical frame which would enhance posters or other works of art wherein the value of the poster or work of art is such that it would not warrant the cost associated with conventional framing.

Another object of this invention is to provide a poster frame which can be easily measured and cut to size, requiring only the use of common household instruments, such as a knife or pair of scissors, and, a marking device such as a pencil.

Still another object of this invention is to provide such a framework that is adaptable for use with all conventional walls, doors and the like but which may be easily put in place or removed from one location to another without damaging the poster, wall or door.

Still another object is to proved a frame which is light weight yet compact and self-supporting and does not require the use of other backing materials and could be hung using simple, light weight plastic frame hangers and push/map pins or small foam mounting pads.

Still another object of this invention is to provide such separately formed members that may be made economically by the slitting of foamboard like materials and the die cutting of plastic like materials both of which could be bonded to functional adhesives.

Another objective is to provide a series of easy to follow steps in assembling the framework which would, when followed, show the framed piece off as a taut, decorative piece of art thereby eliminating unsightly tapes and tacks.

DESCRIPTION OF THE PREFERRED EMBODIMENTS OF THE INVENTION

Figure 1:
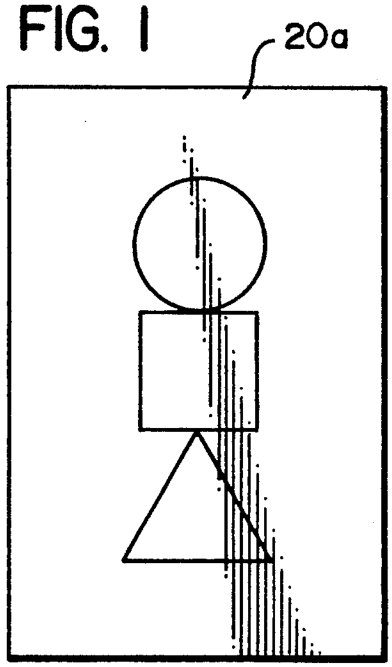
FIG. 1 depicts the front view of a strut framed poster showing the frame to be totally hidden from view.
Figure 2:
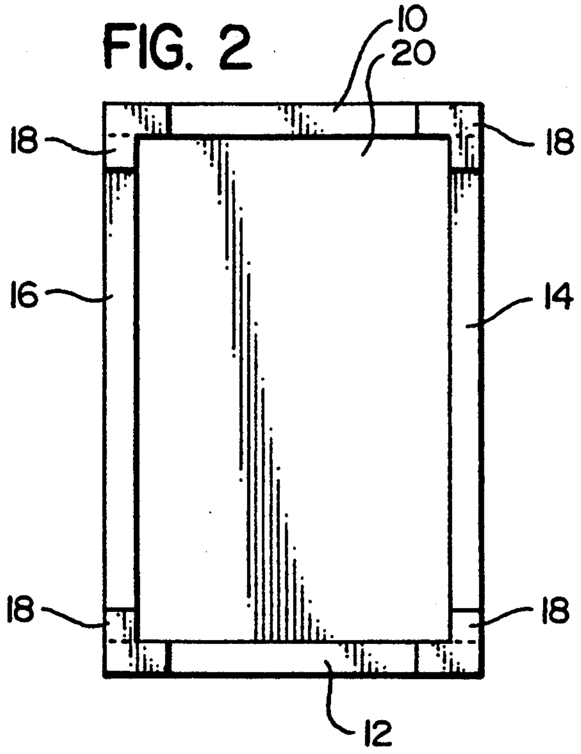
FIG. 2 depicts the back side of a strut framed poster according to a typical embodiment of the invention. The poster is attached to frame struts which are reinforced by corner support braces.
Figure 3:
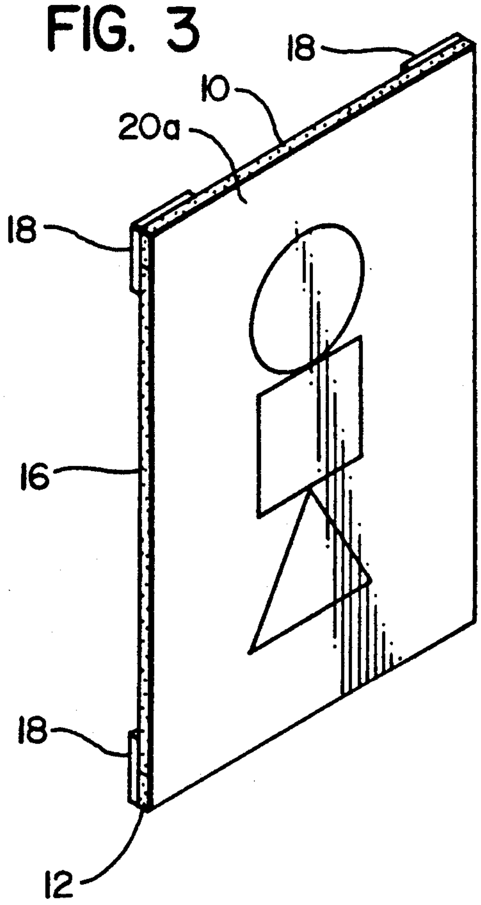
FIG. 3 depicts a perspective view of the same framed poster as viewed in FIG. 1.
Figure 4:
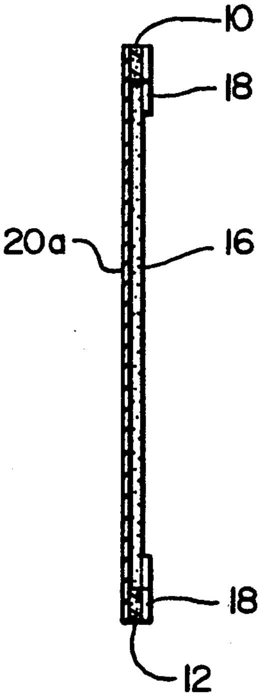
FIG. 4 depicts a profile view of the framed poster in FIG. 1.
Figure 5:
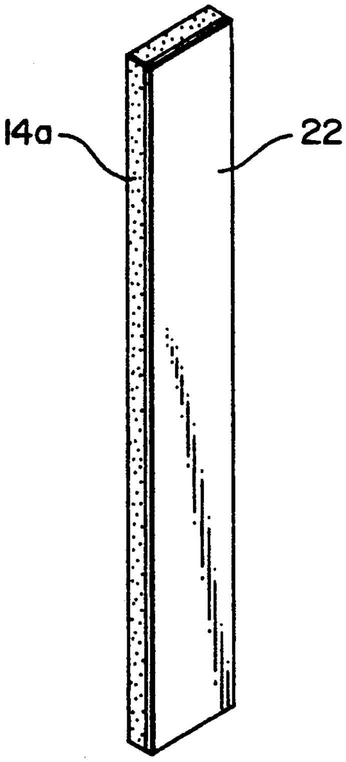
FIG. 5 depicts a dimensional view of a frame strut before the adhesive protective release liner is removed for frame placement.
Figure 6:
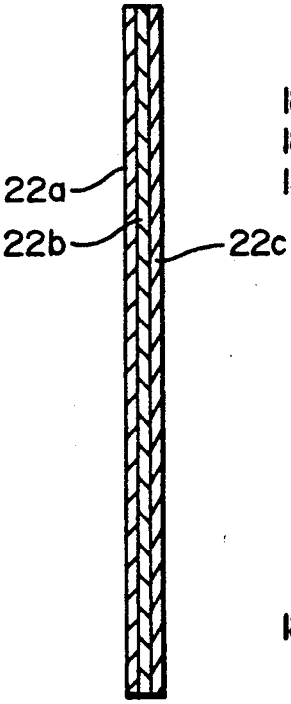
FIG. 6 depicts an enlarged profile view of the double sided, peel and stick adhesive tape and liner that is used to attach to both the frame strut and the poster.

Referring now to the figures wherein the reference to FIG. 2 generally denotes one embodiment of the invention of a cut to size, strut framework bonded with a low tack adjustable adhesive for framing posters, photographs, maps, prints charts, presentation displays and other art work of various sizes. When the framed poster 20*a* is displayed, there is no sign of the strut framework from a front view as shown in FIG. 1. The relationship of the framework to the poster 20*a* can be more clearly seen from the perspective illustration of FIG. 3. There are four separate strut members referred to as frame struts, 10, 12, 14, 16, shown in the general embodiment of the invention in FIG. 2. Each frame strut is formed from the process of slitting sheets of pliable, composite foamboard like material, the width of which can vary from less than ½" to more than a full two inches. The length of each of the frame struts can also vary, but, if cut in lengths adequate to frame standard, full sized, posters of 24 inches by 36 inches, the struts could accommodate most poster applications. This could be achieved by cutting two struts 10, 12 to 24 inch lengths and cutting two other struts 14, 16 to 36 inch lengths. These two lengths would provide frame strut members which could be used for a wide range of poster applications wherein the struts could be cut down to conform to smaller posters but could also frame a poster up to two inches wider or longer than the given dimensions. Each frame strut is bonded to the high tack side of a high-low tack, double sided, pressure sensitive adhesive tape with protective release liner 22 which is bonded to a frame strut member as if the adhesive and protective release liner were one piece as seen in FIG. 5. The adhesive features are seen enlarged in FIG. 6 where the high tack side 22*a* is exposed and would be pressed down and bonded to a composite foamboard like strut 14*a* while the low tack side of the adhesive film 22*b* remains covered by a protective release liner 22*c* for later bonding to the back of a poster. The width of the adhesive tape can vary from less than ½ the width of the strut to it's full width.

Figure 7:
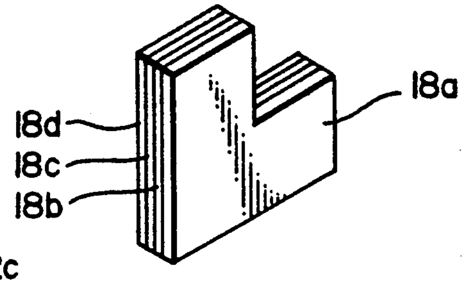
FIG. 7 depicts a front perspective view of the back side of a corner support brace used to enhance the framed structure once the frame struts are assembled in place as shown in FIG. 1.
Figure 8:
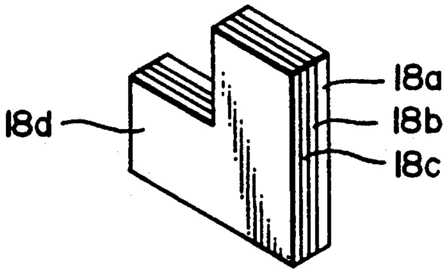
FIG. 8 depicts a front perspective view of the front side of a corner support brace which still remains to be positioned in a corner of the framed poster. This view shows a double coated adhesive tape with its protective release liner affixed to a plastic like die cut material.
Figure 9:
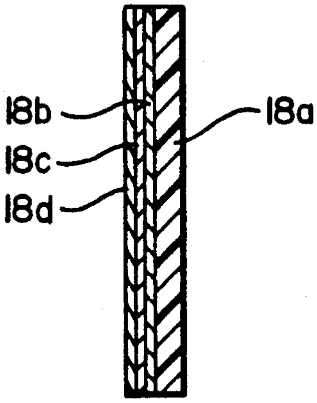
FIG. 9 depicts a cross-sectional view of the corner support brace and the double coated adhesive tape and release liner attached to the plastic die cut plastic like brace.
Figure 14:
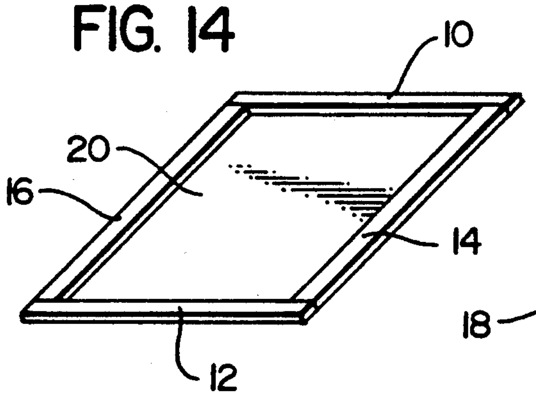
FIG. 14 illustrates the final placement of all four frame strut members and shows the joints formed by the perpendicular placement of the final two frame struts between the first and second frame struts according to the process of the invention of FIG. 2.
Figure 15:
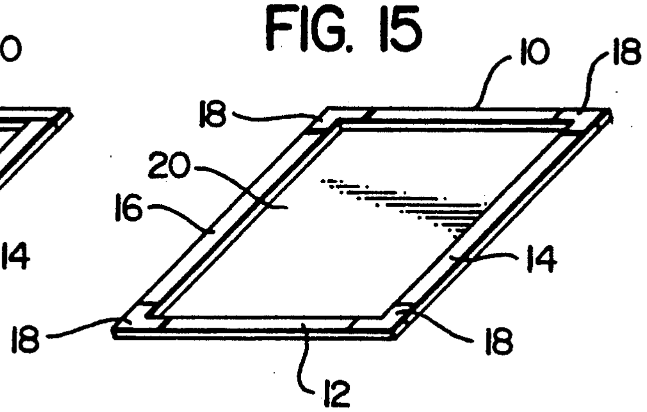
FIG. 15 illustrates the placement of the corner support braces over the corners and joints formed by all four frame struts being configured in FIG. 14.

FIG. 7 shows a corner support brace. The outward side 18*a* is made of a plastic like material, die cut in an L-shaped configuration and is already bonded to a double sided, pressure sensitive adhesive 18*b* while the other side of the adhesive 18*c* is covered by a protective release liner 18*d*. FIG. 8 displays the same corner support brace from an inward side perspective in which the adhesive protective release liner 18*d* is prominent. These components are defined as Corner Support Braces and are positioned over the corner joints of the frame assembly where the perpendicular frame struts come together to form right angles as seen in FIG. 14. The Corner Support Braces provide frame reinforcement, and enhanced frame rigidity at the corners. FIG. 9 is a cross-section view of a Corner Support Brace in which 18*d* is the protective release liner covering 18*c*, one side of a high tack adhesive tape with the other side 18*b* being pressed down and bonded to the plastic like L-shaped member 18*a*.

Figure 10:
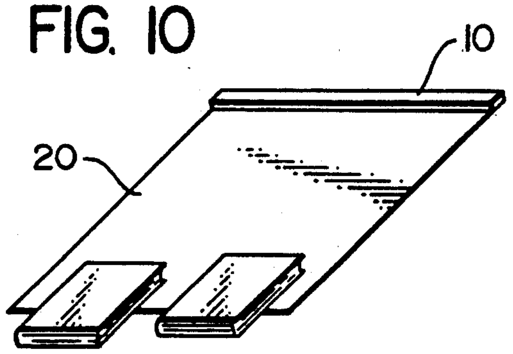
FIG. 10 illustrates the placement of the first frame strut member according to the process of the invention of FIG. 2.
Figure 11:
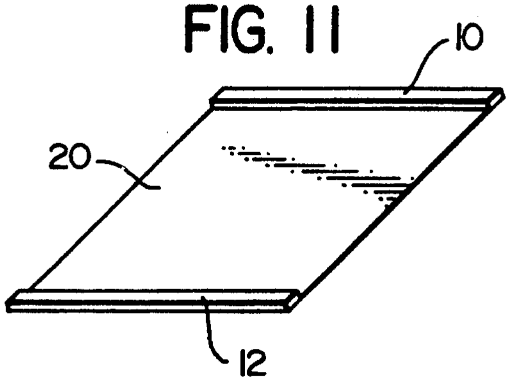
FIG. 11 illustrates the placement of the second frame strut member according to the process of the invention of FIG. 2.
Figure 12:
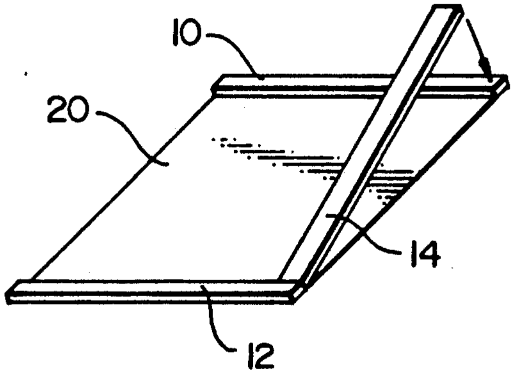
FIG. 12 illustrates the placement of the third frame strut member according to the process of the invention of FIG. 2.
Figure 13:
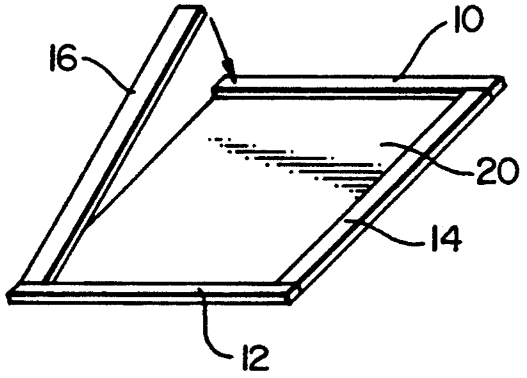
FIG. 13 illustrates the placement of the forth frame strut member according to the process of the invention of FIG. 2.

FIG. 10 illustrates the first step in assembling the framework of the embodiment of this invention wherein the first frame strut 10 is measured, marked and cut a length equal to or slightly under the dimensional width of the shorter side of the poster 20. The protective release liner covering the low tack adhesive surface of the strut is removed from the forward side of strut 10 and the strut is pressed down on the top back of the poster 20. (Books can be used, as illustrated in FIG. 10, to hold down the opposite back end of the poster if the poster has a tendency to curl over on itself). FIG. 11 shows the same poster 20 with both frame struts 10 and 12 attached. Frame strut 12 is applied in the same way that frame strut 10 is attached to the poster and is normally placed at the opposite end of the poster from which the first strut is applied. Both of the first two frame struts can be cut to the same length assuming the opposite ends of the poster or work of art are of equal length. FIG. 12 shows the poster 20 with the third frame strut 14 being attached to one of the two remaining sides. It is measured and cut so as to fit snugly between the first two struts 10, 12. Once the strut is cut and the protective release liner is removed, one effective way to position the strut is to place both ends in place forming right angles with the first two struts 10, 12. This will cause a slight bowing of the strut which can then be worked into position by pressing down from the center of the bow and continuing to press downward in both directions until the strut is firmly affixed to the poster back. FIG. 13 shows the final strut 16 being applied in a similar fashion to the remaining side of the poster back outer edge.

In the method employed, two end frame struts are cross-cut to size and mounted to the shorter end edges of the poster. The first step is to cut 10 to fit one of the two shorter sides of a poster. Once measured and cut, the adhesive release liner 22*c* is peeled back exposing 22*b*, the low tack side of the adhesive film. A convenient means of doing this is to align one of the end frame members and the peel off a short portion of the adhesive sheet. Then as the frame member is laid down along the back edge of the poster, the protective release liner is peeled off to expose the pressure sensitive repositionable adhesive tape which causes it to be bonded to the poster. This affords a simple system of obtaining good alignment. A second method of applying the first strut, 10, is to peel the entire release liner off the strut and roll the strut onto the top edge of the poster beginning from the top outside edge of the poster. The second strut 12, is measured and marked to length for the opposite side of the poster from the first attached side. This strut may be applied in the same ways as the first strut was attached to the poster.

The other two longer side frame struts, 14, 16, can be cut so that they are just slightly longer than the required dimension needed to complete the rectangle, that is, the inner distance between the first two affixed struts. Strut 14 is first measured and then cross-cut so as it measures slightly longer than the distance between the inside edges of strut 10 and strut 12 as shown in FIG. 12. The adhesive release liner is then peeled from 14 and placed in between opposite inner end portions of the first two end frame pieces so that there is a slight bow at the mid point of strut 14. Strut 14 is then pressed downward beginning from the center of the bow in strut 14 and working the strut down onto the poster in both directions causing the adhesive to engage with the edges of the paper. This causes a very slight stretching of the poster paper to make sure that it is mounted without wrinkles and is taut. The same procedure is followed to attach the final strut, 16.

Once the frame struts are affixed to the poster, the release liner 18*d*, as shown in FIG. 8 and enlarged as part of the cross-section of FIG. 8, of the corner support braces 18 can be peeled and the corner support braces can be attached to each corner of the frame to cover the juncture between the joints formed by the joining of the frame struts as shown in FIG. 14. Various hanging devices can be used to attach the rear side of the framed poster to a wall or door, which when displayed presents only a view of the framed poster 20*a* as shown in FIG. 1, without frontal signs of the frame structure supporting the poster.

The pieces and mounting methods described above illustrate the preferred embodiment of this invention, however, it is understood that various materials, connection, techniques, modifications and adaptions of the invention can be made by those skilled in the art without departing form the spirit of the invention and, accordingly, the invention is not to be taken as limited by the above description, and that all changes and modifications that come within the spirit of the invention are desired to be protected.

What is claimed as new is:

1. A method of providing poster with a perimeter mounting frame, said method comprising:

a. providing a poster having a front display surface, a back surface, first and second end edge portions, and first and second side edge portions;

b. providing first and second end struts, each having an adhesive surface, said first and second end struts having lengthwise dimensions such as to extend substantially entirely along said first and second end edge ortions, respectively;

c. placing said first end strut with its adhesive surface against said first end edge portion of the poster to cause said first end strut to adhere to said first end portion;

d. placing said second end strut with its adhesive surface against said second end edge portion of the poster to cause said second end strut to adhere to said second end portions with both end portions of the first end strut being free to move relative to the end portions of the second end strut;

e. providing first and second side struts, each having an adhesive surface, and each having end edges substantially perpendicular to a lengthwise axis of each of said first and second side struts.

f. positioning said first side strut between first end portions of said first and second end struts so that said first side strut extends along said first side portion of the poster, with the adhesive portion of the first side strut facing the first side edge portion of the poster, and with the end edges of the first side strut abutting against adjacent end side surface portions of said first and second end struts, which end side surface portions are substantially parallel to lengthwise axes of said first and second end struts, said first side strut having a lengthwise dimension at least equal to a distance between the adjacent end side surface portions of the first and second end struts in a manner that said first side strut extends the first side portion of the poster to its full length dimension, with said first side strut adhering to said first side portion of the poster;

g. positioning said second side strut between second end portions of said first and second end struts so that said second side strut extends along said second side portion of the poster, with the adhesive portion of the second side strut facing the second side edge portion of the poster, and with the end edges of the second strut abutting against adjacent side end surface portions of said first and second end struts, which end side surface portions are substantially parallel to lengthwise axes of said first and second end struts, said second side strut having a lengthwise dimension at least equal to a distance between the adjacent end side surface portions of the first and second end struts, in a manner that said second side strut extens the second side portion of the poster to its full length dimension, with said second side strut adhering to said first side portion of the poster.

2. The method as recited in claim 1, wherein said end and side struts are bonded to the back surface of the poster.

3. The method as recited in claim 1, wherein said end and side struts are positioned within a perimeter edge portion of said poster.

4. The method as recited in claim 1, wherein the lengthwise dimension of each of said first and second side struts is slightly greater than the distance between the adjacent end side surface portions of the first and second end struts with the poster positioned to its full length dimension, and in moving said first and second side struts into position against the poster, the poster is stretched between said first and second end struts.

5. The method as recited in claim 1, wherein said struts initially have their adhesive surfaces covered by a protective layer, and said protective layer of each strut is removed to expose said adhesive layer to be bonded to said poster.

6. The method as recited in claim 1 further comprising placing braces at juncture locations of said end and side struts to prevent relative rotation between said end and side struts.

7. A poster and perimeter frame combination, with the poster being mounted to the perimeter frame, made in accordance with the method of claim 1.

8. The combination as recited in claim 7, made in accordance with the method of claim 2.

9. The combination as recited in claim 7, made in accordance with the method of claim 3.

10. The combination as recited in claim 7, made in accordance with the method of claim 4.

11. The combination as recited in claim 7, made in accordance with the method of claim 5.

12. The combination as recited in claim 7, made in accordance with claim 6.

* * * * *